United States Patent [19]
Gunnerson

[11] 3,808,748
[45] May 7, 1974

[54] ADJUSTABLE MOUNTING BRACKET FOR WORKPIECE

[75] Inventor: Carl L. Gunnerson, Buena Park, Calif.

[73] Assignee: The Zealot Corporation, Las Vegas, Nev.

[22] Filed: May 8, 1972

[21] Appl. No.: 251,460

[52] U.S. Cl. .............................................. 51/219 R
[51] Int. Cl. .............................................. B24b 3/30
[58] Field of Search ............... 51/216 R, 219 R, 234

[56] References Cited
UNITED STATES PATENTS

| | | | |
|---|---|---|---|
| 2,907,149 | 10/1959 | Whitesel | 51/219 R |
| 3,132,453 | 5/1964 | Heckendorf | 51/219 R |
| 2,870,579 | 1/1959 | Siemsen et al. | 51/219 R |
| 3,039,244 | 6/1962 | Vickerman | 51/219 R |

*Primary Examiner*—Othell M. Simpson
*Attorney, Agent, or Firm*—Jackson & Jones

[57] ABSTRACT

A mounting bracket assembly that is capable of being pivotally mounted to a base plate adjacent a machining operation such as a grinding wheel. A pair of guide bars permit a relative positioning of a vertical support member which carries the workpiece. A U shape bracket member is pivotally mounted on the vertical support with the pivot point being positioned above the axis of the workpiece in the vertical support thereby permitting the workpiece to be moved into the grinding wheel by rotation about the pivot point. A spring biased shaft carries at one end a collet for holding the workpiece and at the other end an indexing means for permitting a selective rotation of the workpiece for progressive machining operations. A sleeve surrounds the shaft and is fixedly positioned by the U shape bracket to serve as an adjustable mounting seat for the spring. The spring serves the function of biasing the indexing operation while also permitting both a fine adjustment and a safety factor to prevent the workpiece from jamming during the machining operation.

6 Claims, 3 Drawing Figures

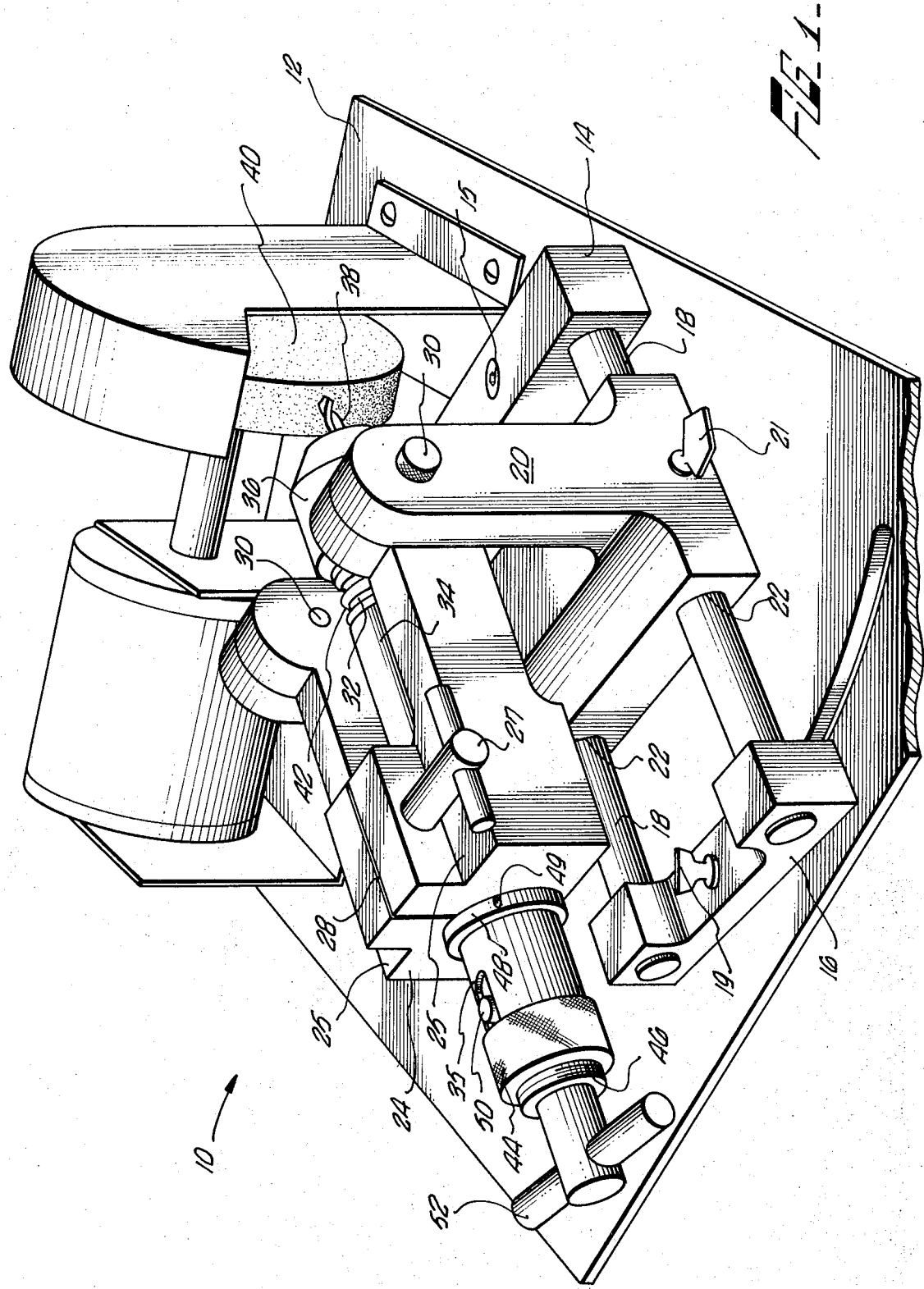

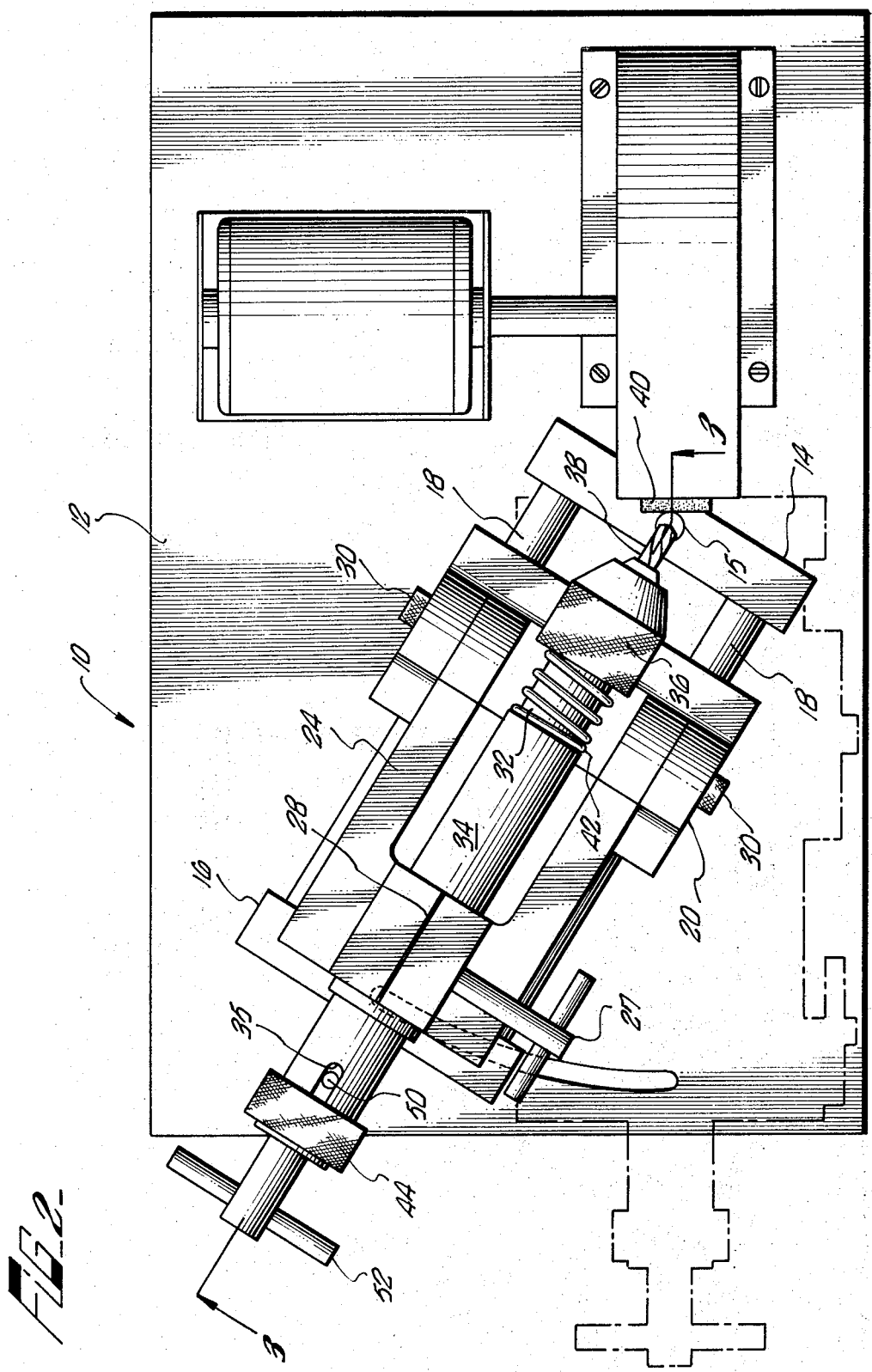

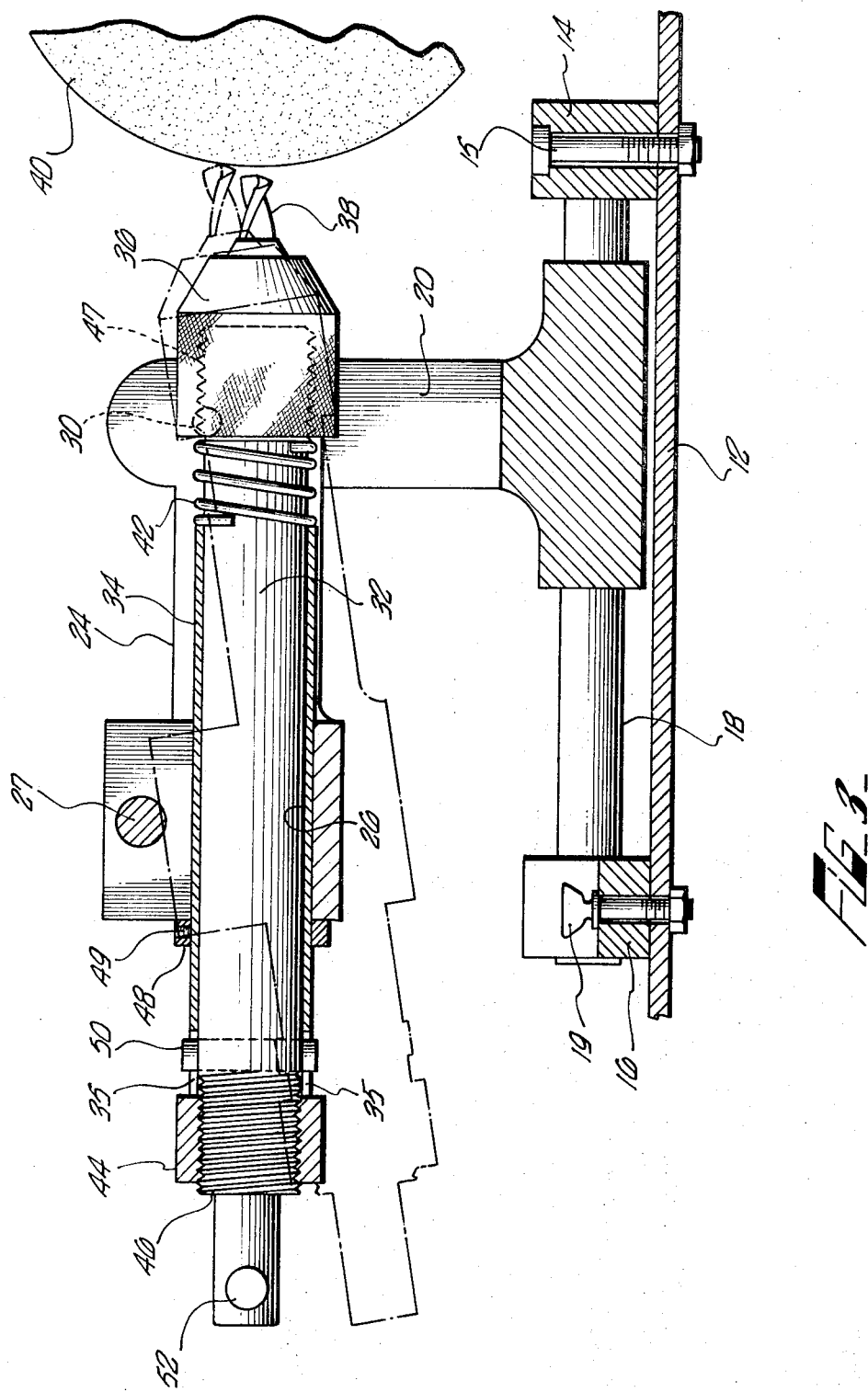

ADJUSTABLE MOUNTING BRACKET FOR WORKPIECE

BACKGROUND OF THE INVENTION

1. Field of the Invention

The present invention provides an adjustable mounting bracket for positioning a workpiece during a machining operation and more particularly provides a mounting bracket particularly designed for facilitating the sharpening of a drill bit on a grinding wheel.

2. Description of the Prior Art

While numerous methods and apparatus have been utilized for positioning workpieces with respect to machining operations, generally in the field of sharpening drill bits between a half inch and an eighth of an inch in diameter, a home repairman or small machine shop has been forced to resort to a hand held sharpening operation with at best a guide arrangement using angle irons. A stud projecting position member would be positioned adjacent the grinding wheel with the drill bit clamped onto an angle iron member and guided into contact with the grinding wheel. Misalignment problems were common and the machining operation was both time consuming and subject to error.

SUMMARY OF THE INVENTION

The present invention provides an efficient method and apparatus for sharpening drill bits with a minimum of effort by the operator. The desired drill bit angle is readily set by a pivoting adjustment of the lower mounting brackets relative to the base plate. The drill bit can be placed in the collet and tightened into place with a four finger camming member. The vertical supports are slidably adjusted on guide bars and fastened into position by adjusting screws. The drill bit is suspended on the same horizontal plane as the center of the grinding wheel and the grinding operation is effectuated by the pivoting of the drill bit about the pivot connections on the vertical support above the axis of the drill bit. By this motion, the drill bit is moved into the grinding wheel and the desired sharpening takes place. By virtue of the spring biasing of the shaft that supports the drill bit, a safety factor is provided to prevent jamming of the drill bit with the grinding wheel. In addition, the spring also permits an indexing which commonly involves a 180° revolving of the drill bit to place the workpiece in position to sharpen the other side.

The U shape bracket carries a bore for receiving the sleeve and shaft that position the workpiece. The bore is split so that an axial tightening can be effectuated by an adjusting screw. The sleeve can carry a collar stop for positioning the workpiece relative to the U shape bracket. The sleeve is slotted to accommodate indexing studs for the appropriate positioning. The number of indexing slots can be varied but generally a single pair will suffice for sharpening drill bits. A fine adjustment collar is positioned adjacent the indexing slots to permit precise aligning of the drill bit with the grinding wheel.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the present invention;

FIG. 2 is a plan view of the present invention; and

FIG. 3 is a cross sectional side view of the present invention.

DESCRIPTION OF THE PREFERRED EMBODIMENT

Referring to FIG. 1, a mounting apparatus 10 is provided with a base plate 12 capable of positioning a pivoting mounting bracket 14. The pivoting mounting bracket 14 can revolve about a pivot shaft 15 mounted to the base plate 12. A pair of cylindrical guide bars 18 attached between the pivoting mounting bracket 14 and an adjustable mounting bracket 16. The adjustable mounting bracket 16 carries an adjustment screw 19 that permits an angular setting of the mounting apparatus 10 relative to the grinding member 40. A vertical support member 20 has a pair of bores 22 which respectively receive the guide bars 18. An adjusting screw 21 is mounted on the vertical support member 20 and is capable of fixing the vertical support member 20 at any point along the guide bars 18. A U shape bracket 24 is pivotally mounted to the vertical support member 20 by a pair of pivot connections 30. At the opposite end of the U shape bracket member relative to the pivot connection, a bore 26 is provided with a cut or slot 28 to permit an axial adjustment of the bore size. A pair of shoulders 25 is provided with an adjusting screw 27 extending beyond one of the shoulders 25 to permit an axial adjustment of the size of the bore 26. Positioned within the bore 26 is a shaft member 32 and a cylindrical sleeve 34 which surrounds the shaft member 32. A collet 36 is positioned at one end of the shaft member and surrounds a four finger camming member that is not shown. The collet 36 is threaded onto the shaft member and is capable of releasably engaging a workpiece 38 such as a drill bit. The cylindrical sleeve 34 provides a seat for a spring 42 that biases the shaft 32 by a seating contact against the collet 36. The spring 42 serves three functions; namely, a biasing for an index action to be described below, a biasing for a fine adjustment of the workpiece 38 relative to the grinding member 40, and finally a safety factor to prevent the workpiece 38 from jamming in a destructive fashion against the grinding member 40.

At the opposite end of the cylindrical sleeve 34 relative to the spring 42 are a pair of slots 35 adapted to receive the projecting indexing studs 50 that protrude from the shaft member 32. The number of slots are adjustable depending upon the degree of rotation of the workpiece 38 that is desirable. The slots 35 are cut into the cylindrical sleeve 34. At the end of the shaft member 32 a handle 52 is provided for effectuating the indexing of the workpiece 38. Adjacent the handle 52 the shaft member 32 has a threaded portion 46 which receives a fine adjustment collar 44 that is capable of positioning the workpiece 38 in an axial direction relative to the mounting apparatus 10. A stop collar 48 is provided on the outside surface of the cylindrical sleeve 34. A threaded stud 49 permits the stop member 48 to be adjusted at any position along the cylindrical sleeve 34. It should be noted that the pivot connections 30 are located on the vertical support 20 above the axial longitudinal center of the workpiece 38 and shaft member 32. By reason of this pivotal connection 30 the workpiece can be moved axially inward into the grinding member 40 to effectuate the machining operation.

In operation, a workpiece such as an eighth of an inch or a quarter of an inch drill bit is positioned within the collet 36 and the collet 36 is rotated about the threaded end portion 47 of the shaft member 32 thereby causing the fingers of the camming member (not shown) to grasp the workpiece 38 firmly. The adjustable mounting bracket 16 can, if desired, be moved relative to the base plate 12 and the grinding member 40 and locked in the desired position by the adjusting screw 17. This pivoting action permits the angle of the workpiece 38 to be adjusted relative to the grinding member 40. The vertical support member 20 is slid forward on the guide bars 18 and locked firmly into position by the adjusting screw 21. Any fine adjustments of the workpiece 38 relative to the grinding member 40 is accomplished by rotation of the fine adjustment collar 44. Position of the workpiece 38 and the shaft member 32 are, of course, adjustable by releasing the tension of the adjusting screw 27 on the U shape bracket 24. This generally is utilized merely to permit the shaft member 32 to be moved into a position whereby the workpiece 38 can be easily mounted in the collet 36.

The grinding of the workpiece 38 is accomplished by rotating in the vertical direction the U shape bracket 24 about the pivot connections 30 whereupon the workpiece 38 is moved into a grinding contact with the grinding member 40. An operator by grasping handle 52 and exerting a pulling force in the axial direction of the shaft member 32 can force the collet 36 back against the bias of the spring 42 and release the indexing studs 50 from their position within the slots 35 of the cylindrical sleeve 34. The collet 36 and the workpiece 38 are then revolved until the indexing studs 50 again are positioned in the slots 35 but at a displacement of 180°. As a result of this indexing operation, the workpiece 38 has been revolved 180°. By again vertically pivoting the U shape bracket 24, the workpiece 38 is then moved into a grinding operation of the grinding member 40 and the other side of the drill bit as shown in the preferred embodiment is ground identically with the first side of the drill bit.

Various modifications in the present invention can be effectuated by a person of ordinary skill in the art and accordingly, the scope of the present invention should be measured solely from the following claims.

What is claimed is:

1. An adjustable apparatus for workpieces that are to be machined by a machining member comprising:
   a mounting bracket assembly capable of being fixed relative to the machining member;
   an adjustable support member mounted on the mounting bracket assembly and capable of movement towards and away from the machining member;
   a workpiece holding means pivotably connected to the support member for holding the workpiece and moving it towards the machining member including a shaft member, a cylindrical sleeve mounted on the shaft member, a spring mounted between the shaft member and the sleeve, and a U shape bracket adjustably carrying the cylindrical sleeve, the U shape bracket pivotably connected to the adjustable support member offset from the longitudinal axis of the workpiece thereby permitting the workpiece to be moved towards the machining member as it pivots; and
   an indexing means on the holding means biased by the spring for rotating the workpiece a fixed amount thereby permitting a machining operation at a different angular position of the workpiece.

2. An adjustable apparatus in claim 1, further including a collet mounted on the shaft member and seating the spring.

3. An adjustable apparatus as in claim 2 further including fine adjusting means mounted adjacent the indexing means on the shaft member.

4. An adjustable apparatus as in claim 2 where the indexing means includes at least one projecting stud on the shaft member and at least two slots on the cylindrical sleeve.

5. An adjustable apparatus as in claim 3 further including a stop member mounted on the cylindrical sleeve.

6. An adjustable apparatus as in claim 5 where the mounting bracket assembly includes a pair of mounting brackets, one bracket capable of a pivoting mounting while the other bracket is capable of being fixed at any desired angle relative to the machining member.

* * * * *